Patented July 27, 1937

2,088,017

UNITED STATES PATENT OFFICE 2,088,017

OXYGENATED ALIPHATIC COMPOUNDS DERIVED FROM 2-ETHYLBUTYRALDEHYDE

Jacob N. Wickert, Charleston, and Clare A. Carter, South Charleston, W. Va., assignors, by mesne assignments, to Union Carbide and Carbon Corporation, a corporation of New York No Drawing. Application December 18, 1934, Serial No. 758,032

17 Claims. (Cl. 260—134)

The invention relates to the production of certain new oxygenated compounds derived from 2-ethylbutyraldehyde, and more especially it concerns the production of a new series of ketones and their derivatives, including saturated secondary branched-chain alcohols and sulphate esters thereof. These ketones as a class possess properties adapting them for use as lacquer solvents, particularly for use with natural resins and with synthetic resins used for brushing finishes, such as those of the vinyl, polyvinyl, and glyptal types. The secondary alcohols and the sulphate esters thereof possess in high degree properies adapting them for use as wetting, foaming, emulsifying and impregnating agents, as detergents, and in treatment liquors in the textile, leather and other industries.

In its broadest scope the invention involves the condensation of ethylbutyraldehyde with an aliphatic ketone to form a ketol which then is made to lose the elements of water to form an unsaturated ketone. The latter may be hydrogenated selectively to a saturated ketone or still further to the corresponding secondary alcohol. Moreover, the above-mentioned unsaturated and saturated ketones thus formed may be condensed further with a primary or a secondary aldehyde, such as butyraldehyde or ethylhexaldehyde, and the ketol dehydrated to form an unsaturated ketone which then may be hydrogenated as hereinafter described to produce the corresponding secondary alcohol.

The secondary alcohol, upon sulphation under suitable conditions, yields an acid sulphate ester of the alcohol which, upon neutralization with a suitable base, forms the corresponding neutral sulphate ester. Among bases suitable for the purpose may be mentioned alkaline compounds of the alkali metals and of the alkaline earth metals, and nitrogenous bases such as ammonia, the alkyl amines, and substituted amines such as triethanolamine.

The condensation of ethylbutyraldehyde with the selected ketone may be effected at temperatures of 20° to 30° C., in the presence of any alkali which will catalyze the reaction, such as caustic soda, potash, or some organic amines, such as diethanolamine, pyridine, etc.

A concurrent reaction, due to direct oxidation or to the auto-oxidation and reduction of the aldehyde, which is catalyzed by the alkali, (Cannizzaro's reaction), and which renders the reaction mixtures acid, is minimized or prevented by the use of starting materials and equipment free from copper, manganese, and other metals known to catalyze the air-oxidation of these aldehydes, and by avoiding the presence of air in the reaction vessel.

High yields of the ketols may be secured and acid formation minimized also by the intermittent or slow addition of the alkali in small amounts during the condensation so as to maintain a minimum alkalinity consistent with suitable operation. Preferably the reaction mixture is kept just alkaline to phenolphthalein at all times.

The resultant ketols easily lose the elements of water, especially upon heating above 100° C. in the presence of a catalytic proportion (less than 1%, usually .1 to .2% by weight) of a dehydrating agent such as sulphuric, phosphoric, or hydrobromic acids, or a few crystals of iodine. For those substances whose unsaturated ketones tend strongly to condense with themselves, a weak acid such as acetic, carbonic, or tartaric acid preferably is used.

The resulting unsaturated ketones are quite stable to light and heat, but tend to condense with themselves to form resins or tars in the presence of strong alkalies or acids. The tendency of the lower unsaturated ketones to polymerize may be reduced by using iodine as the dehydration catalyst.

The hydrogenation of the unsaturated ketone preferably is effected by molecular hydrogen in the presence of from 1% to 10% of an active hydrogenation catalyst, at temperatures ranging from 60° to 150° C. or more. However, the hydrogenation may be accomplished by any of the usual methods. Activated nickel catalysts such as those prepared from nickel-silicon or nickel-aluminum alloys are particularly suitable as catalysts, as are finely-divided platinum, and copper.

The hydrogenation may be effected at pressures ranging from atmospheric to around 1000 pounds per square inch, depending upon the desired degree of hydrogenation. Where a saturated ketone is the desired product, pressures of around 800 pounds per square inch and temperatures of about 60° to 75° C. may be employed, aided by external cooling of the reaction vessel. Where complete hydrogenation to the secondary alcohol is desired, the pressure preferably may be around 900 pounds per square inch, and a temperature slowly rising to a maximum of 150° C. may be used. The hydrogenation products is filtered, and the filtrate, usually water white, is fractionated, preferably under reduced pressure.

The alkyl sulphates of these secondary alcohols may be made by known sulphation methods, using for example, concentrated sulphuric acid, sulphur trioxide, or chlorsulphonic acid. Use of the latter is preferable, and produces a superior product. The resultant products, upon neutralization with a suitable alkaline compound such as caustic soda, or with an organic amine, yield colorless solids of wax-like consistency, which are entirely soluble in water and in the usual organic solvents such as methanol, diethyl ether, and acetone. Aqueous solutions of these various sulphate esters have been examined to evaluate the esters as wetting and emulsifying agents and as detergents. The wetting and emulsifying power of these products was measured by the method of relative "drop numbers". This method consists in dropping slowly a fixed volume of a .25% aqueous solution of the sulphate ester from a ground tip into a body of kerosene at 30° C. The tip is calibrated by counting the number of drops of pure water formed under like conditions; and the greater number of drops of the solution being examined measures the relative interfacial tension or emulsifying power of the substance tested. When this measurement is made carefully from a tip of known diameter, the interfacial tension can be calculated in dynes, as described by Harkins & Brown, J. A. C. S., 41, 499 (1919); and E. B. Millard, Ind. Eng. Chem., 15, 810 (1923).

The invention may be illustrated by the following examples, in which the reactants are given in parts by weight:

*Example 1*

To a cooled and agitated mixture of 1550 parts of acetone and 1700 parts of 2-ethylbutyraldehyde was added enough of a 10% solution of sodium hydroxide in methanol to render the mixture just alkaline to phenolphthalein. The temperature which rose quickly to 60° C. was reduced by cooling to 30° C. which was maintained during the reaction period of twenty hours. Small additions of caustic soda totalling 15 g. were made at intervals to maintain the desired degree of alkalinity.

The reaction mixture was then neutralized by acetic acid (carbonic, tartaric, or other weak acid may be used), and the neutral liquid was filtered to remove the salt formed. The clear filtrate was fractionally distilled. The low-boiling fractions, consisting of unreacted starting materials, methanol and some water, were removed under atmospheric pressure. After this stripping operation, a small proportion (about 1 c. c. per 5 liters) of concentrated sulphuric acid was added as dehydration catalyst. The fractionation was then continued under reduced pressure.

This addition of acid may be omitted, in which case, upon distillation of the said filtrate the hereinafter described intermediate ketol, evidently 3,ethylheptanol-4-one-6, is obtained, boiling at about 87° C. at 3 mm. of mercury absolute pressure, and boiling at about 205°–206° C. with some decomposition at atmospheric pressure.

The fraction of the acidified filtrate boiling principally at 77°–78° C. under 13 mm. of mercury absolute pressure contained the unsaturated 9-carbon ketone having the apparent formula 3,ethylhepten-4-one-6. This ketone, redistilled, had the properties set out in Table 1.

This ketone, mixed with 5% of its weight of an active nickel catalyst, was heated at 60°–70° C. for about six hours, under a hydrogen pressure of 700–900 pounds per square inch gauge. The product was cooled, filtered, and the filtrate fractionally distilled, yielding the saturated ketone, 3,ethylheptone-6, a water-white liquid having considerable solvent power for vinyl resins and other synthetic resins and materials used in lacquer production, and which was compatible with the usual lacquer solvents and diluents.

Separate portions of the saturated and of the unsaturated 9-carbon ketone mentioned above were subjected to hydrogenation in the following manner, yielding the same secondary alcohol.

The selected ketone was mixed with 5% of its weight of active nickel catalyst and was heated to 150° C. with agitation for from twelve to eighteen hours, under a hydrogen pressure of from 700 to 900 pounds per square inch. The resultant product was filtered; and the filtrate was fractionally distilled under reduced pressure, yielding the secondary nonyl alcohol, 3,ethylheptanol-6, as a colorless liquid, boiling at about 100° C. at 27 mm. of mercury absolute pressure.

This secondary nonyl alcohol was dissolved in an equal weight of $\beta\beta'$ dichlorethyl ether, and this was slowly mixed at about 10° C. with a solution of one part of chlorsulphonic acid in three parts of $\beta\beta'$ dichlorethyl ether, with constant agitation while passing air through the liquid. (The air can be replaced by nitrogen, natural gas, or other gas, inert to the reactants under the reaction conditions. This gas removes most of the hydrogen chloride formed.) The final reaction product was then poured into cold water and neutralized with sodium hydroxide, thus forming the sodium salt of the mono-alkyl sulphate of the alcohol. This salt was extracted from the ether solution with water; and the ether layer was decanted. A small amount of sodium bicarbonate, (less than 1% of the contained solids) was added to the aqueous solution, and it was evaporated to dryness under reduced pressure at a temperature below 100° C. The residue was extracted with methanol to dissolve the sulphate ester and separate it from inorganic salts, and the mixture was filtered. The clear filtrate was then evaporated to dryness, yielding the sodium nonyl sulphate as a snow-white wax, which was completely soluble in water, methanol, and other organic solvents. Other characteristics of this compound are contained in the accompanying Table II.

*Example 2*

A mixture of 920 parts of acetone and 2300 parts of 2-ethylbutyraldehyde was condensed by addition of 12 parts of caustic soda dissolved in methanol, in the manner described in Example 1. The reaction product was stripped of unreacted starting materials, acidified with sulphuric acid, and was fractionated under reduced pressure as in Example 1.

After separation of the 9-carbon unsaturated ketone fraction mentioned in Example 1, and a later mid-cut, a fraction was obtained boiling principally at about 156°–160° C. under 15 mm. of mercury absolute pressure. This was a 15-carbon doubly unsaturated ketone, apparently 3,9, diethylundecadien-4,7,-one-6, formed by the condensation of a second molecule of ethylbutyraldehyde with the 9-carbon ketol or with the 9-carbon unsaturated ketone, followed by a dehydration.

Portions of this 15-carbon doubly unsaturated ketone were hydrogenated in the manner described in Example 1, one portion at temperatures around 60°–70° C., and another portion at temperatures ranging up to 150° C. That at the lower temperatures yielded the saturated ketone, apparently 3,9,diethylundecanone-6; while the high temperature hydrogenation yielded the secondary pentadecyl alcohol, 3,9-diethylundecanol-6, recovered as shown in Example 1.

The corresponding sodium pentadecyl sulphate was prepared in the same manner as the sodium nonyl sulphate described in Example 1. It yields a stable froth when shaken in water solution, and shows important detergent properties.

The unsaturated 9-carbon ketone mentioned in Example 1 may be substituted for the acetone as a starting material,—condensing with ethylbutyraldehyde to form the above-mentioned 15-carbon doubly-unsaturated ketone, with overall yields of more than 80% of the latter.

Likewise, by reacting ethylbutyraldehyde with the saturated 9-carbon ketone produced in Example 1, in the presence of caustic alkali dissolved in methanol, there is produced a singly unsaturated ketone, 3,9-diethylundecen-4-one-6, which by hydrogenation in the manner described in Example 1 may be converted into the respective saturated 15-carbon ketone and into the secondary pentadecyl alcohol described above.

Furthermore, the unsaturated 9-carbon ketone prepared in Example 1 may be condensed further with an aldehyde to produce a new series of compounds. For example, 1.7 parts of the said ketone was condensed with 1.55 parts of ethylhexaldehyde. The reaction was catalyzed with .045 part of sodium hydroxide under the conditions described in Example 1. The 17-carbon doubly unsaturated ketone 3,9 diethyltridecadien-4-7-one-6, described hereinafter in Example 5, was produced.

By substituting in the above example the saturated 9-carbon ketone of Example 1 for the unsaturated 9-carbon ketone, and following the same procedure, there is produced an unsaturated 17-carbon ketone, 3,9 diethyltridecen-7-one-6, with an efficiency of around 89% on the basis of the ethylhexaldehyde used.

Example 3

Over a period of four hours, 11 mols (1.1 kg.) of 2-ethylbutyraldehyde was slowly added to a mixture containing 20 mols (2 kg.) of methylisobutyl ketone and a methanolic solution containing 20 g. of potassium hydroxide, maintained at a temperature of 15° to 25° C. during this period and for 16 hours thereafter. The reaction mixture was made just neutral to phenolphthalein by glacial acetic acid, and was filtered. A crystal of iodine was added to the clear filtrate, and it was fractionally distilled. After removal of the unreacted starting materials, the pressure was reduced to 10 mm. of mercury absolute, and the product was obtained boiling at 98° to 100° C. at this pressure. This unsaturated 12-carbon ketone apparently was 3,ethyl-8-methylnonene-4-one-6.

The latter was hydrogenated in the liquid phase at temperatures up to 150° C. under 700–900 pounds per square inch hydrogen pressure, using a nickel catalyst, until no further hydrogen absorption occurred. The cooled product was filtered, and the filtrate fractionally distilled under reduced pressure. The fraction boiling at 108°–110° C. under 7 mm. of mercury absolute pressure was the secondary dodecyl alcohol, 3-ethyl-8-methylnonanol-6.

This secondary alcohol was sulphated with chlorsulphonic acid and the product neutralized with caustic soda in the manner recited in Example 1, yielding the neutral sodium sulphate ester of the alcohol as a colorless wax. The methylisobutyl ketone used in this example may be prepared by hydrogenating mesityl oxide, (obtained by condensing acetone with itself in the presence of an alkali), and dehydrating the diacetone alcohol thus formed.

Example 4

12 mols of 2-ethylbutyraldehyde and 25 mols of methylamyl ketone,—the latter of which may be prepared by condensing acetone and butyraldehyde to form butylidene acetone and hydrogenating the product,—were reacted in the presence of a methanolic solution of caustic soda in accordance with the conditions of Example 1. After nineteen hours the product was washed with about half its volume of water, the insoluble layer was decanted from off the wash water, and was made slightly acid to phenolphthalein with phosphoric acid. The acidified liquid was fractionally distilled under reduced pressure, and the unsaturated 13-carbon ketone, apparently 3 ethylundecen-4-one-6, was recovered as a pale yellow liquid boiling at 138° C. at 19 mm. of mercury absolute pressure.

This unsaturated ketone was hydrogenated under 700–900 pounds per square inch gauge pressure at 150° C., in the presence of an active nickel catalyst. The product was filtered and the filtrate was fractionally distilled in vacuum to give the secondary tridecyl alcohol as a water-white liquid boiling at 142° C. at 18 mm. of mercury absolute pressure. This apparently was 3, ethylundecanol-6. It was sulphated with chlorsulphonic acid in the manner set out in Example 1, forming the acid sulphate ester which, upon neutralization in the manner therein described, yielded the corresponding sodium tridecyl sulphate as a colorless wax, completely soluble in water and organic solvents.

Example 5

900 parts of 2-ethylbutyraldehyde were added slowly during two hours to 2070 parts of unsaturated 11-carbon ketone, 5 ethylnonene-3-one-2, made alkaline by 25 parts of KOH as a 10% methanolic solution, the temperature being maintained at 20°–25° C. for twenty hours until the specific gravity at 20° C. reached a maximum. The product was made slightly acid to phenolphthalein with sulphuric acid, and the mixture was filtered. The clear filtrate was distilled under reduced pressure. After removal of the unreacted starting materials, 1005 parts of a yellow liquid were recovered, boiling between 155° and 160° C. under 7 mm. of mercury absolute pressure. This was the 17-carbon doubly unsaturated ketone, having apparently the formula 3,9 diethyltridecadien-4-7-one-6.

A portion of this ketone was hydrogenated under the conditions set out in Example 1 in connection with the production of the saturated 9-carbon ketone. Upon fractional distillation of the filtrate obtained by filtering the product of this hydrogenation, a quantity of the saturated 17-carbon ketone, apparently 3,9 diethyltridecanone-6, was recovered, boiling at 162° C. under 10 mm. of mercury absolute, and having the properties hereinafter set out.

Upon hydrogenating another portion of the unsaturated ketone under pressures of 700–900 pounds per square inch, and at temperatures up to around 150° C., the secondary heptadecyl alcohol, 3,9 diethyltridecanol-6 was formed, boiling at 134° C. under 3 mm. of mercury absolute pressure. It was recovered upon fractional distillation at reduced pressure of the filtrate secured upon filtration of this hydrogenated product.

Upon sulphating this alcohol with a solution of chlorsulphonic acid in ββ'dichlorethyl ether, in accordance with the conditions of Example 1, and neutralizing the acid sulphate ester with caustic soda, the sodium heptadecyl sulphate was produced as a colorless wax having excellent wetting and cleansing properties.

*Example 6*

2 parts of the saturated 11-carbon ketone, 5, ethylnonanone-2, was condensed with 1.2 parts of 2-ethylbutyraldehyde, using .02 part of caustic soda dissolved in methanol, following the procedure outlined in Example 1. Upon fractional distillation of the crude product from the dehydration step, and redistillation of the fraction boiling between 115° and 165° C. under 4 mm. of mercury absolute pressure, the mono unsaturated 17-carbon ketone, 3,9 diethyltridecen-4-one-6, was obtained. This ketone boils at 142° C. under 3 mm. of mercury absolute pressure. Upon hydrogenation of portions of this product, in accordance with the two procedures of Example 1, the respective 17-carbon saturated ketone, and the secondary heptadecyl alcohol, both described in Example 5, were obtained.

Table I sets out some of the physical properties of certain members of the series of ketones and secondary alcohols of the present invention; and Table II lists identifying properties of certain of the sodium secondary alkyl sulphates of the invention.

supra. Practical qualitative wetting tests were made by dropping loose balls of cotton and wool yarn on the surface of 75 c.c. of .25% aqueous solutions of the sulphate esters contained in 100 c. c. beakers held at 26° C., and noting the time elapsed before the yarn sank to the bottom of each beaker. Those sulphates having 13 or more carbon atoms in the molecules wet cotton at least sixty times as rapidly,—and wet wool at least twenty times as rapidly,—as those having less than 13 carbon atoms in the molecules.

By the practice of the invention it is possible to produce, in operations under commercially attainable conditions, a series of ketols, ketones and secondary alcohols having more than 8 carbon atoms in their molecules, and also the sodium or other water-soluble secondary alkyl sulphates derived from such alcohols, which compounds possess important properties adapting them for a wide variety of uses in the textile, leather, lacquer and other industries. The process of the invention involves the employment as starting materials of compounds readily produced commercially; and a succession of steps are used in which the conditions of temperature and pressure are so selected that undesirable destructive decomposition of the starting materials and intermediate products is prevented or minimized.

The neutral sulphate esters of the branched-chain, secondary higher alcohols of the invention are actively dissolved by the usual organic solvents, such as methanol and ethanol, acetone, benzol, toluol, hexane, chloroform, and ethyl dichloride.

TABLE I

*Physical properties of condensation products*

| Item | | Carbon atoms in molecule | Boiling range | | Specific gravity 20° C. | Refractive index 20° C. |
|---|---|---|---|---|---|---|
| | | | 760 mm. | °C./mm. of mercury vacuum | | |
| | | | °C. | | | |
| 1 | 3, ethylheptanol-4-one-6 | 9 | 206 | 87°/3 mm. | 0.928 | 1.4462 |
| 2 | 3, ethylhepten-4-one-6 | 9 | 192 | 77–8/13 | 0.848 | 1.4479 |
| 3 | 3, ethylheptanone-6 | 9 | 186 | 72/11 | 0.837 | 1.4263 |
| 4 | 3, ethylheptanol-6 | 9 | 191 | 100/27 | 0.837 | 1.4351 |
| 5 | 3, 9 diethylundecadiene-4, 7-one-6 | 15 | 284 | 158/15 | 0.874 | 1.4719 |
| 6 | 3, 9 diethylundecanone-6 | 15 | 281 | 143/9 | 0.854 | 1.4453 |
| 7 | 3, 9 diethylundecanol-6 | 15 | 283 | 158/17 | 0.854 | 1.4492 |
| 8 | 3, ethyl-8-methylnonene-4-one-6 | 12 | | 100/10 | 0.844 | |
| 9 | 3, ethyl-8-methylnonanol-6 | 12 | 232 | 109/7 | 0.834 | 1.4390 |
| 10 | 3, ethylundecen-4-one-6 | 13 | 256 | 138/19 | 0.850 | 1.4552 |
| 11 | 3, ethylundecanol-6 | 13 | 258 | 142/18 | 0.839 | 1.4455 |
| 12 | 3, 9 diethyltridecadien-4, 7- one-6 | 17 | 313 | 155–160/7 | 0.865 | 1.4750 |
| 13 | 3, 9 diethyltridecanone-6 | 17 | 306 | 162/10 | 0.847 | 1.4479 |
| 14 | 3, 9 diethyltridecanol-6 | 17 | 308 | 134/3 | 0.847 | 1.4537 |
| 15 | 3, 9 diethyltridecen-4-one-6 | 17 | 309 | 142/3 | 0.856 | 1.4640 |
| 16 | 3, 9 diethyltridecen-7-one-6 | 17 | 308 | 146/3 | 0.855 | 1.4598 |

TABLE II

| Substance | 0.25% aqueous solution | |
|---|---|---|
| | Drop number at 30° C. | Interfacial tension dynes per sq. cm. at 26° C. |
| Sodium nonyl sulfate | 30 | 32.9 |
| Sodium dodecyl sulfate | 42 | 25.9 |
| Sodium tridecyl sulfate | 60 | 16.6 |
| Sodium pentadecyl sulfate | 114 | 8.4 |
| Sodium heptadecyl sulfate | 516 | 2.3 |
| Water | 22 | 44.2 |

The relative drop numbers and interfacial tension values were obtained by the method of Harkins and Brown, and that of Millard, mentioned The invention is susceptible of modification within the scope of the appended claims.

We claim:

1. The process of producing a saturated aliphatic oxygenated compound having more than eight carbon atoms in the molecule, which comprises condensing ethylbutyraldehyde with an aliphatic ketone in the presence of an alkali, removing the elements of water from the resultant ketol to form an unsaturated ketone having in its molecule six more carbon atoms than are in the first-named ketone, and partially hydrogenating the unsaturated ketone to at least remove the unsaturated bond.

2. The process of producing a saturated aliphatic ketone having more than eight carbon atoms in the molecule, which comprises condensing 2-ethylbutyraldehyde with a ketone selected from the group consisting of acetone, methylamyl ketone, methylisobutyl ketone, 5, ethylnonene-3-one-2, 5,ethylnonanone-2, 3, ethylheptene-4-one-6, and 3,ethylheptanone-6, in the presence of an alkali, removing the elements of water from the resultant ketol to form an unsaturated ketone having in its molecule six more carbon atoms than in the first-named ketone, and partially hydrogenating the unsaturated ketone to remove the unsaturated bond.

3. The process which comprises condensing ethylbutyraldehyde with an aliphatic ketone in the presence of an alkali, removing the elements of water from the ketol thus formed, thereby producing an unsaturated ketone, and hydrogenating the latter under superatmospheric pressure at temperatures up to about 150° C. in the presence of an active hydrogenating catalyst.

4. As a chemical compound, an aliphatic saturated ketone in the form of a clear liquid boiling at a temperature above about 186° C. under atmospheric pressure and having the composition represented by the formula

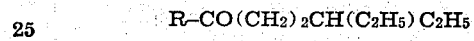
R—CO(CH$_2$)$_2$CH(C$_2$H$_5$)C$_2$H$_5$ wherein R designates an aliphatic residue.

5. As a chemical compound, a saturated nonyl ketone, the same being a liquid boiling at 72° C. under 11 mm. of mercury absolute pressure and at 186° C. under atmospheric pressure, and apparently having the composition indicated by the designation 3,ethylheptanone-6.

6. As a chemical compound, diethylundecanone, the same being a clear liquid boiling at 143° C. under 9 mm. of mercury absolute pressure, and boiling at 281° C. under atmospheric pressure, having a specific gravity at 20° C. of .854, and apparently having the composition indicated by the designation 3,9 diethylundecanone-6.

7. As a chemical compound, diethyltridecanone, the same being a 17-carbon saturated aliphatic ketone boiling at about 162° C. under 10 mm. of mercury absolute pressure, and boiling at about 306° C. under atmospheric pressure.

8. As a new chemical compound, a secondary aliphatic branched-chain alcohol having the structure corresponding to the designation

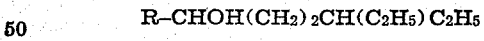
R—CHOH(CH$_2$)$_2$CH(C$_2$H$_5$)C$_2$H$_5$ wherein R represents a straight-chain or a branched-chain aliphatic radical.

9. A chemical compound identical with that resulting from the hydrogenation of an unsaturated 9-carbon ketone, the same being a secondary branched-chain nonyl alcohol in the form of a clear liquid boiling at 100° C. under 27 mm. of mercury absolute pressure, and boiling at 191° C. under atmospheric pressure.

10. A chemical compound identical with that resulting from the hydrogenation of a doubly-unsaturated 15-carbon ketone, the same being a secondary branched-chain pentadecyl alcohol in the form of a clear liquid boiling at 158° C. under 17 mm. of mercury absolute pressure, and boiling at 283° C. under atmospheric pressure.

11. A chemical compound identical with that resulting from the hydrogenation of an unsaturated 17-carbon ketone, the same being a secondary branched-chain heptadecyl alcohol in the form of a clear liquid boiling at 134° C. under 3 mm. of mercury absolute pressure, and boiling at 308° C. under atmospheric pressure.

12. The process of producing a saturated secondary branched-chain monohydric alcohol having more than eight carbon atoms in the molecule, which comprises condensing 2-ethylbutyraldehyde with a ketone selected from the group thereof consisting of acetone, methylamyl ketone, methylisobutyl ketone, 5 ethylnonene-3-one-2, 5 ethylnonanone-2, 3 ethylheptene-4-one-6, and 3 ethylheptanone-6, in the presence of an alkali, removing the elements of water from the resultant ketol to form an unsaturated ketone having in its molecule six more carbon atoms than the first-named ketone hydrogenating the unsaturated ketone under superatmospheric pressure at temperatures within a range up to around 150° C., and recovering from the resultant reaction mixture the saturated secondary branched-chain monohydric alcohol thus produced.

13. The process which comprises condensing 2-ethylbutyraldehyde with a ketone selected from the group consisting of acetone, methylamyl ketone, methylisobutyl ketone, 5,ethylnonene-3-one-2, 5,ethylnonanone-2, 3,ethylheptene-4-one-6 and 3,ethylheptanone-6, in the presence of an alkali, removing the elements of water from the resultant ketol to form an unsaturated ketone having in its molecule six more carbon atoms than the first-named ketone, and at least partially hydrogenating the said unsaturated ketone.

14. Process of producing a saturated aliphatic oxygenated compound which comprises condensing 2-ethylbutyraldehyde with an aliphatic ketone in the presence of a small amount of an alkali, maintaining a selected low alkalinity in the reaction mixture during the condensation by the addition of successive small amounts of the said alkali, removing the elements of water from the resultant ketol to form an unsaturated ketone having in its molecule six more carbon atoms than are in the first-named ketone, and hydrogenating the unsaturated ketone.

15. In the process of producing a saturated aliphatic oxygenated compound, the steps which comprise condensing 2-ethylbutyraldehyde with an aliphatic ketone in the presence of a small amount of an alkali, while minimizing acid formation by the gradual addition of the alkali in amounts adapted to maintain in the reaction mixture a low alkalinity, removing the elements of water from the resultant ketol, thereby forming an unsaturated ketone, and hydrogenating the unsaturated ketone.

16. As a chemical compound, a saturated aliphatic oxygenated compound, the same being a liquid having a structure corresponding to the designation

RR'(CH$_2$)$_2$CH(C$_2$H$_5$)C$_2$H$_5$ wherein R represents an alkyl group, and R' represents a group selected from the class consisting of a carbonyl group and a secondary alcohol group.

17. As a chemical compound, a saturated aliphatic ketone, the same being a high-boiling liquid having the composition represented by the formula

RCO(CH$_2$)$_2$CH(C$_2$H$_5$)C$_2$H$_5$ wherein R designates a radical selected from the group thereof consisting of methyl, ethylamyl, and ethylnonyl radicals.

JACOB N. WICKERT.
CLARE A. CARTER.

CERTIFICATE OF CORRECTION.

Patent No. 2,088,017.  July 27, 1937.

JACOB N. WICKERT, ET AL.

It is hereby certified that error appears in the printed specification of the above numbered patent requiring correction as follows: Page 2, second column, line 1, for "3, ethylheptone-6" read 3, ethylheptanone-6; and that the said Letters Patent should be read with this correction therein that the same may conform to the record of the case in the Patent Office.

Signed and sealed this 21st day of September, A. D. 1937.

Henry Van Arsdale (Seal)  Acting Commissioner of Patents.